(12) United States Patent
Yoshinaga

(10) Patent No.: US 11,542,098 B2
(45) Date of Patent: Jan. 3, 2023

(54) ARTICLE TRANSPORT VEHICLE

(71) Applicant: Daifuku Co., Ltd., Osaka (JP)

(72) Inventor: Kazuharu Yoshinaga, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 121 days.

(21) Appl. No.: 17/254,453

(22) PCT Filed: Jun. 14, 2019

(86) PCT No.: PCT/JP2019/023634
§ 371 (c)(1),
(2) Date: Dec. 21, 2020

(87) PCT Pub. No.: WO2019/244787
PCT Pub. Date: Dec. 26, 2019

(65) Prior Publication Data
US 2021/0221617 A1    Jul. 22, 2021

(30) Foreign Application Priority Data
Jun. 22, 2018 (JP) .............................. JP2018-119080

(51) Int. Cl.
B65G 1/137    (2006.01)

(52) U.S. Cl.
CPC .................................. B65G 1/1375 (2013.01)

(58) Field of Classification Search
CPC .................................................... B65G 1/1375
See application file for complete search history.

(56) References Cited

U.S. PATENT DOCUMENTS

| 8,955,989 | B2 * | 2/2015 | Wong ..................... G11B 15/68 353/31 |
| 9,487,356 | B1 | 11/2016 | Aggarwal |
| 2014/0058556 | A1 * | 2/2014 | Kawano ............... G05D 1/0297 701/2 |

(Continued)

FOREIGN PATENT DOCUMENTS

| CN | 206217740 U | 6/2017 |
| CN | 108137230 A | 6/2018 |

(Continued)

*Primary Examiner* — Kyle O Logan
(74) *Attorney, Agent, or Firm* — The Webb Law Firm

(57) ABSTRACT

An article transport vehicle (3) includes: a travel portion (11) that travels to set positions (P1) that are set in one-to-one correspondence with a plurality of storage sections (1) that store articles; a supporting portion (12) that supports an article; an illumination portion (13) that emits light; and a control portion that controls the travel portion (11) and the illumination portion (13). Using, as a target storage section (1A), the storage section (1) in which an article to be supported by the supporting portion (12) is stored, the control portion executes travel control to control the travel portion (11) so as to cause the travel portion (11) to travel to the set position (P1) that is set in correspondence with the target storage section (1A); and illumination control to control the illumination portion (13) so as to emit light to an illuminating position (P2) that is located above the plurality of storage sections (1) and that corresponds to the article transport vehicle in a state in which the travel portion (11) is at the set position (P1).

20 Claims, 8 Drawing Sheets

(56) References Cited

U.S. PATENT DOCUMENTS

| | | | | |
|---|---|---|---|---|
| 2016/0145045 | A1* | 5/2016 | Mountz | G06Q 10/087 |
| | | | | 700/218 |
| 2017/0166399 | A1* | 6/2017 | Stubbs | B65G 1/1375 |
| 2017/0337506 | A1 | 11/2017 | Wise et al. | |
| 2018/0342031 | A1 | 11/2018 | Tada et al. | |

FOREIGN PATENT DOCUMENTS

| | | |
|---|---|---|
| EP | 3256290 A1 | 12/2017 |
| JP | H7309409 A | 11/1995 |
| JP | H8244920 A | 9/1996 |
| JP | 2000142927 A | 5/2000 |
| JP | 2008247546 A | 10/2008 |
| JP | 201248531 A | 3/2012 |
| JP | 2018507830 A | 3/2018 |
| WO | 2016130856 A1 | 8/2016 |
| WO | 2018047355 | 3/2018 |

\* cited by examiner

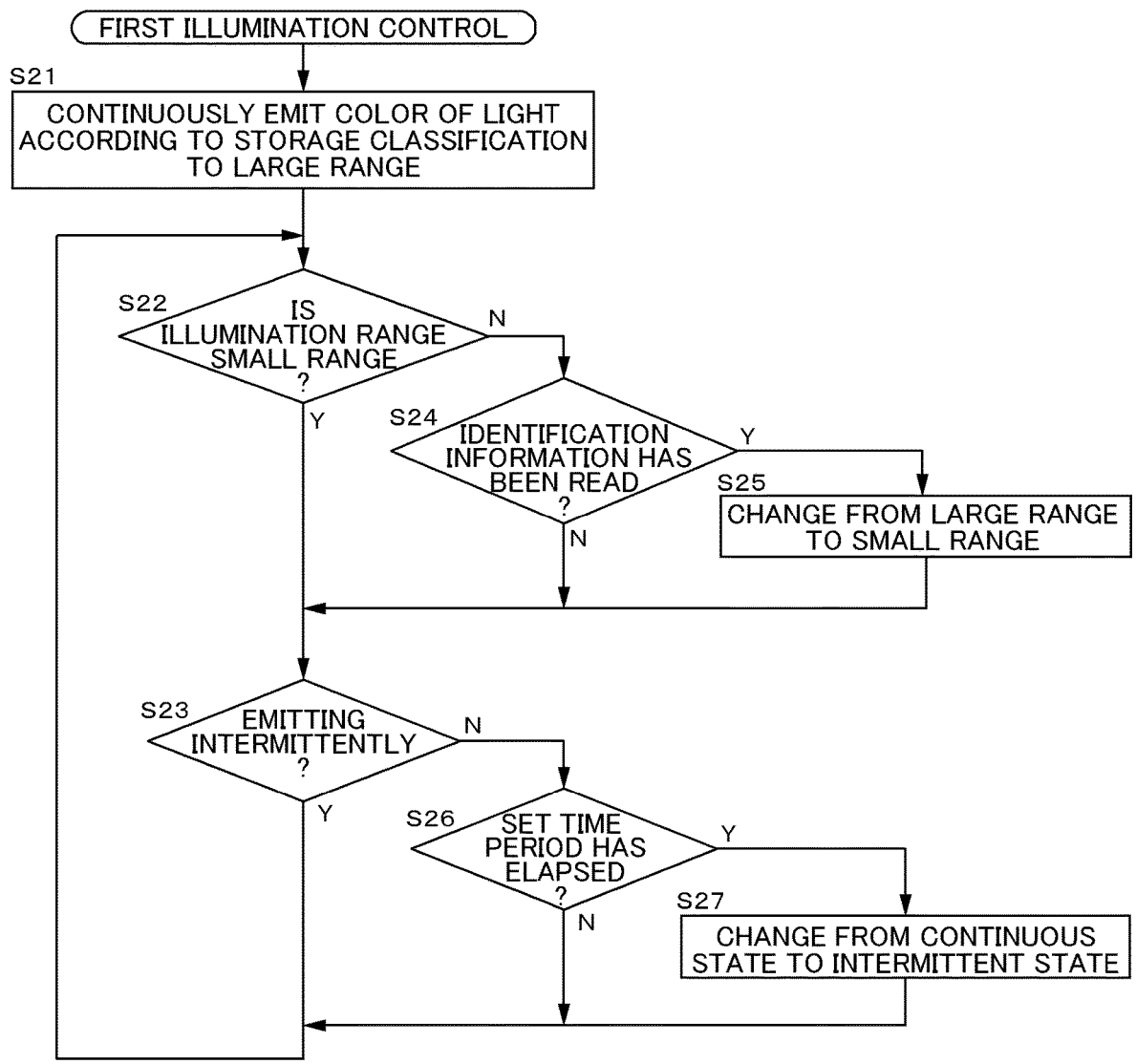

ARTICLE TRANSPORT VEHICLE

CROSS-REFERENCE TO RELATED APPLICATIONS

This application is the United States national phase of International Application No. PCT/JP2019/023634 filed Jun. 14, 2019, and claims priority to Japanese Patent Application No. 2018-119080 filed Jun. 22, 2018, the disclosures of which are hereby incorporated by reference in their entirety.

BACKGROUND OF THE INVENTION

Field of the Invention

The present invention relates to an article transport vehicle including a supporting portion that supports an article.

Description of Related Art

The background art will be described below. The reference numerals or terms in parentheses in the following description are those described in the related art document. An example of the aforementioned article transport vehicle is described in JP 2008-247546A (Patent Document 1). The article transport vehicle (picking truck) of Patent Document 1 is provided in a picking facility. In the picking facility, a picking operation is performed in which the article transport vehicle is moved by being pushed or pulled by an operator so as to be moved to the vicinity of a storage section (article storage section 5) of a target storage rack (3), and an article is retrieved from the storage section of the storage rack and is supported by a supporting portion (container 8) of the article transport vehicle.
Patent Document 1: JP 2008-247546A

SUMMARY OF THE INVENTION

In order to suppress the workload of the operator, it is conceivable to configure the article transport vehicle so as to automatically travel to a set position in the vicinity of the storage section of the target storage rack, thus allowing the operator to perform the picking operation on the article transport vehicle stopped at the set position. However, if the article transport vehicle is configured to travel automatically in this manner, it is difficult for the operator to recognize the need to perform the picking operation on the article transport vehicle when the article transport vehicle is stopped at a position that is not visible, or not easily visible, by the operator, and the picking operation may not be smoothly performed.

Therefore, there is a demand for an article transport vehicle that allows a picking operation to be smoothly performed.

An article transport vehicle according to the present disclosure includes: a travel portion that travels to set positions that are set in one-to-one correspondence with a plurality of storage sections that store articles; a supporting portion that supports an article; an illumination portion that emits light; and a control portion that controls the travel portion and the illumination portion, wherein, using, as a target storage section, the storage section in which an article to be supported by the supporting portion is stored, the control portion executes travel control to control the travel portion so as to cause the travel portion to travel to the set position that is set in correspondence with the target storage section; and illumination control to control the illumination portion so as to emit light to an illuminating position that is located above the plurality of storage sections and that corresponds to the article transport vehicle in a state in which the travel portion is at the set position.

With this configuration, the travel portion travels to the set position by the control portion executing the travel control, and the illumination portion emits light to the illuminating position by the control portion executing the illumination control. The illuminating position is a position that is located above the plurality of storage sections and that corresponds to the article transport vehicle, and therefore, for example, an operator who is away from the article transport vehicle or an operator who is at a location separated by the storage sections can recognize that the article transport vehicle on which the picking operation needs to be performed is at the set position. This allows the operator to more easily notice that the picking operation needs to be performed on the article transport vehicle, thus making it possible to more easily perform the picking operation smoothly.

BRIEF DESCRIPTION OF THE DRAWINGS

FIG. 8 is a flowchart of illumination control.

DETAILED DESCRIPTION OF PREFERRED EMBODIMENTS

1. Embodiment

An embodiment of an article transport vehicle used for a picking facility will be described with reference to the drawings.

Figure 1:
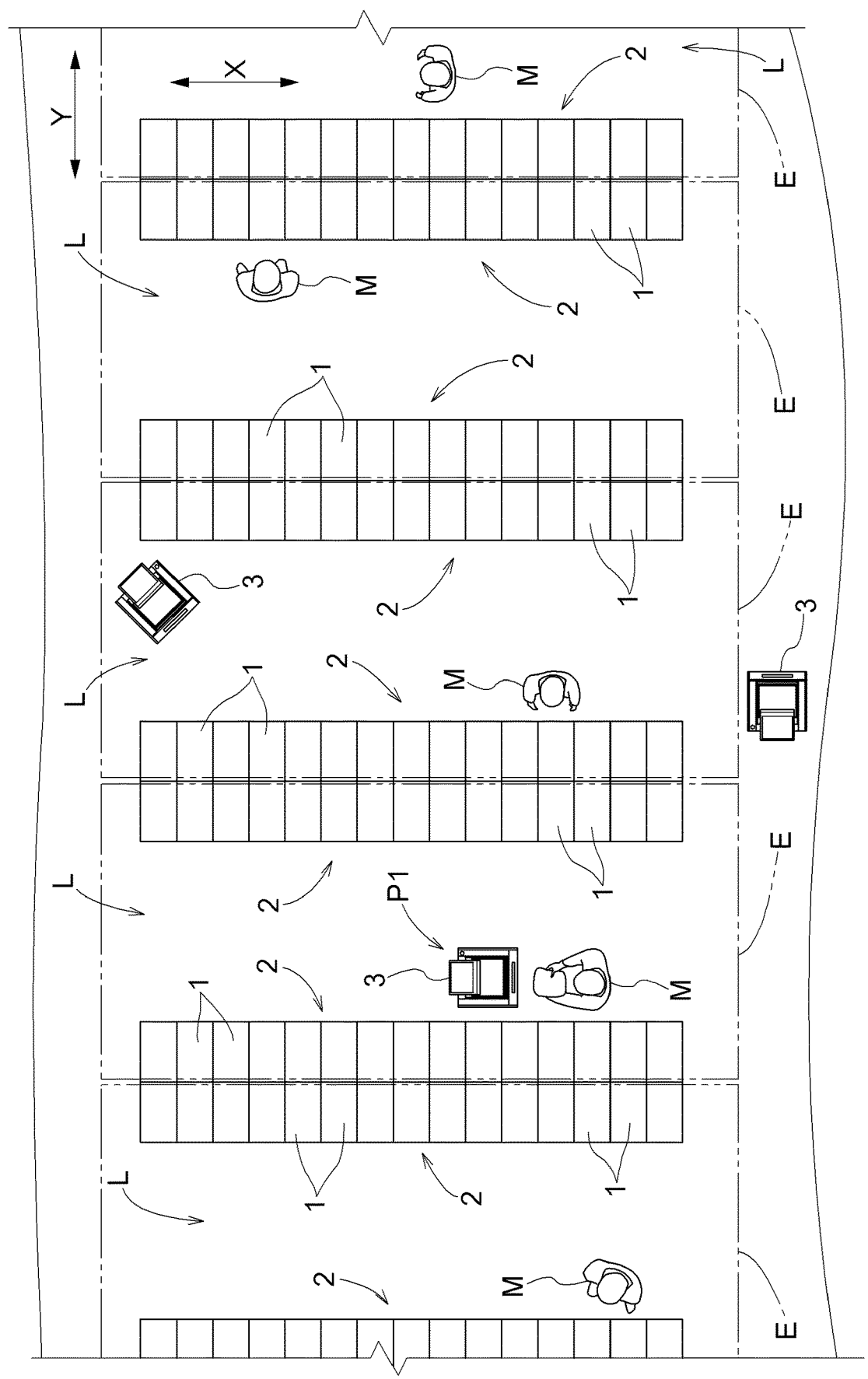
FIG. 1 is a plan view of a picking facility.
Figure 2:
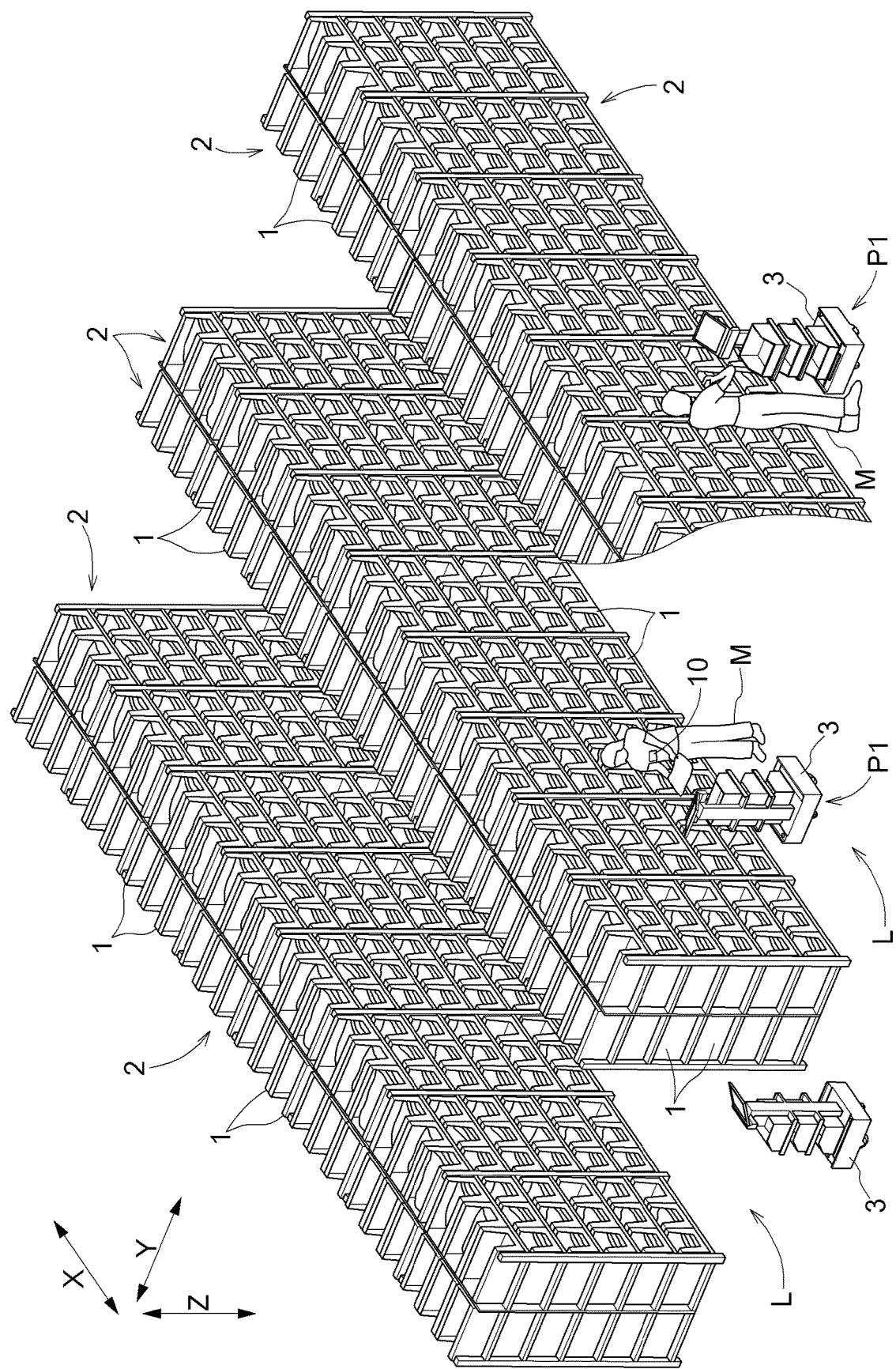
FIG. 2 is a perspective view of the picking facility.

As shown in FIGS. 1 and 2, the picking facility is provided with an article storage rack 2 including a plurality of storage sections 1 that store articles W, an article transport vehicle 3 that travels on a floor surface F, and a control device H (see FIG. 6) that manages the articles W stored in the article storage rack 2 and that controls the article transport vehicle 3.

Figure 4:
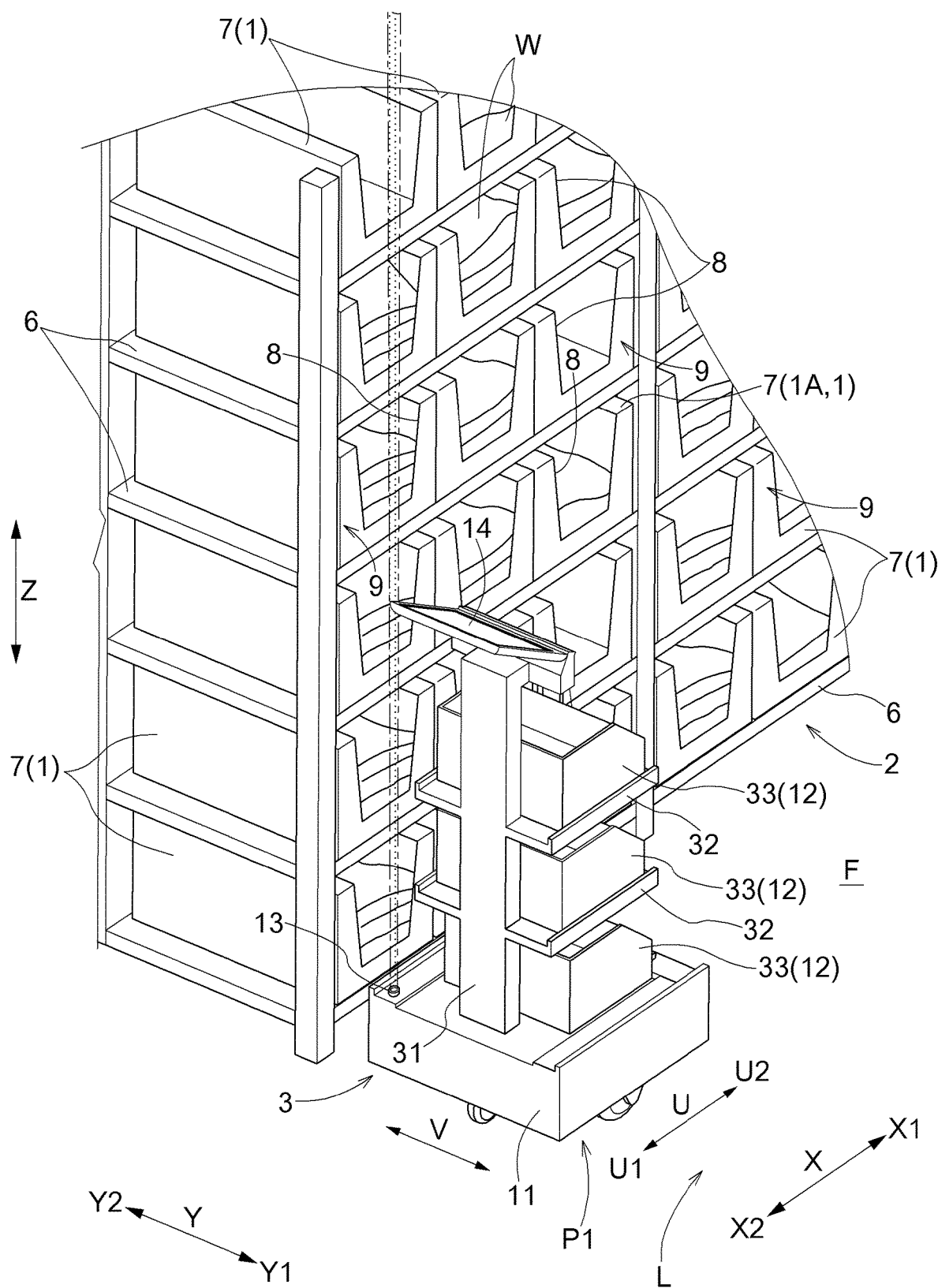
FIG. 4 is a perspective view showing a state in which an illumination portion is illuminating.

In the following descriptions of the article storage rack 2 and the article transport vehicle 3, a direction in which the storage sections 1 of the article storage rack 2 are arranged as viewed in a vertical direction Z is referred to as a "first direction X", and a direction orthogonal to the first direction X is referred to as a "second direction Y". Also, as shown in FIG. 4, one side in the first direction X is referred to as a "first direction-first side X1", and the opposite side thereof is referred to as a "first direction-second side X2. In addition, a side in the second direction Y on which the storage sections 1 are present with respect to the center of an operation aisle L is referred to as a "storage section side Y2", and the opposite side thereof (a side on which the operation aisle L is present with respect to the storage sections 1) is referred to as an "aisle side Y1". As for the article transport vehicle 3, a direction extending along the advancing direction when the article transport vehicle 3 moves straight is referred to a "front-rear direction U", and a direction orthogonal to the front-rear direction U in a horizontal plane is referred to as a "width direction V". Also, the advancing direction side of the article transport vehicle 3 in the front-rear direction U is referred to as a "forward side U1", and the opposite side thereof is referred to as a "rearward side U2".

The article storage rack 2 includes a plurality of storage sections 1 so as to be arranged in the vertical direction Z and the first direction X. By way of further description, the article storage rack 2 includes a plurality of shelf plates 6 so as to be spaced apart from each other in the vertical direction Z, and a plurality of storage containers 7 are placed on the plurality of shelf plates 6 so as to be arranged in the first direction X. Each of the plurality of storage containers 7 provided in the article storage rack 2 in this manner forms a storage section 1. A plurality of types of articles W are stored in the storage containers 7 (storage sections 1) on a type-by-type basis, and one type of articles W are housed in one storage container 7.

Each storage container 7 has an opened surface 9 having an opening 8 for placing the articles W into, and taking the articles W out of, the storage container 7. The storage container 7 is installed in the article storage rack 2 such that the opened surface 9 faces the aisle side Y1. Accordingly, each of the storage sections 1 formed by the storage containers 7 has an opened surface 9 having an opening 8 for placing the articles W into, and taking the articles W out of, the storage container 7. Also, a plurality of storage sections 1 provided in one article storage rack 2 are aligned, with the opened surfaces 9 thereof facing in the same direction.

As shown in FIG. 1, the region in which the article storage racks 2 are installed is divided into a plurality of areas E. Also, in the present embodiment, an operator M in charge is located in each of the plurality of areas E. Each operator M performs, in the area E of which the operator is in charge, a picking operation for transferring the articles W from the article storage rack 2 to the article transport vehicle 3, and a storage operation for transferring the articles W from the article transport vehicle 3 to the article storage rack 2. Note that the number of areas E and the number of operators M can be changed as appropriate. For example, a plurality of operators M may be located in one area E, or one operator M may be in charge of a plurality of areas E. Each operator M has an identification information holder 10. Each identification information holder 10 holds identification information of the operator M having that identification information holder 10. In the present embodiment, the identification information holder 10 is a holder (e.g., an ID card or the like) having an RFID tag, and the identification information of the operator M is stored in the RFID tag.

Figure 6:
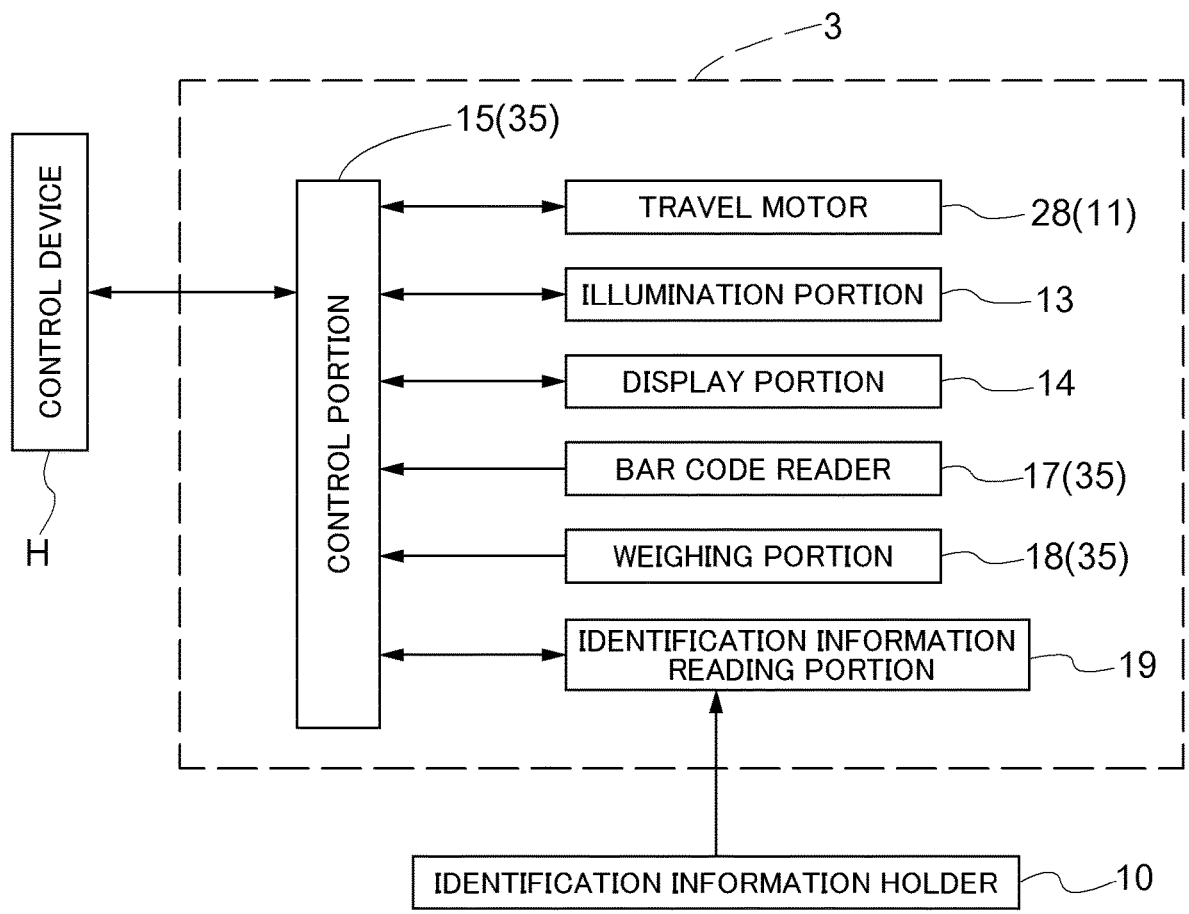
FIG. 6 is a control block diagram.

The control device H shown in FIG. 6 stores storage article information serving as information on the number of articles W stored in the storage sections 1 and the types of articles W stored in the storage sections 1.

The control device H is configured to, when a picking instruction is output from a higher order control portion, transmit picking information to a control portion 15 of the article transport vehicle 3, based on the picking instruction and the storage article information. The picking information is information indicating the position of a storage section 1 (target storage section 1A) from which articles W are to be retrieved by the picking operation, and information on the types and the numbers of articles W that are to be retrieved from the storage section 1. In addition, the control device H is configured to, when a storage instruction is output from the higher order control portion, transmit storage information to the control portion 15 of the article transport vehicle 3, based on the storage instruction and the storage article information. The storage information is information indicating the position of a storage section 1 (target storage section 1A) in which articles W are to be stored by the storage operation, and information on the types and the numbers of articles W that are to be stored in the storage section 1.

Figure 3:
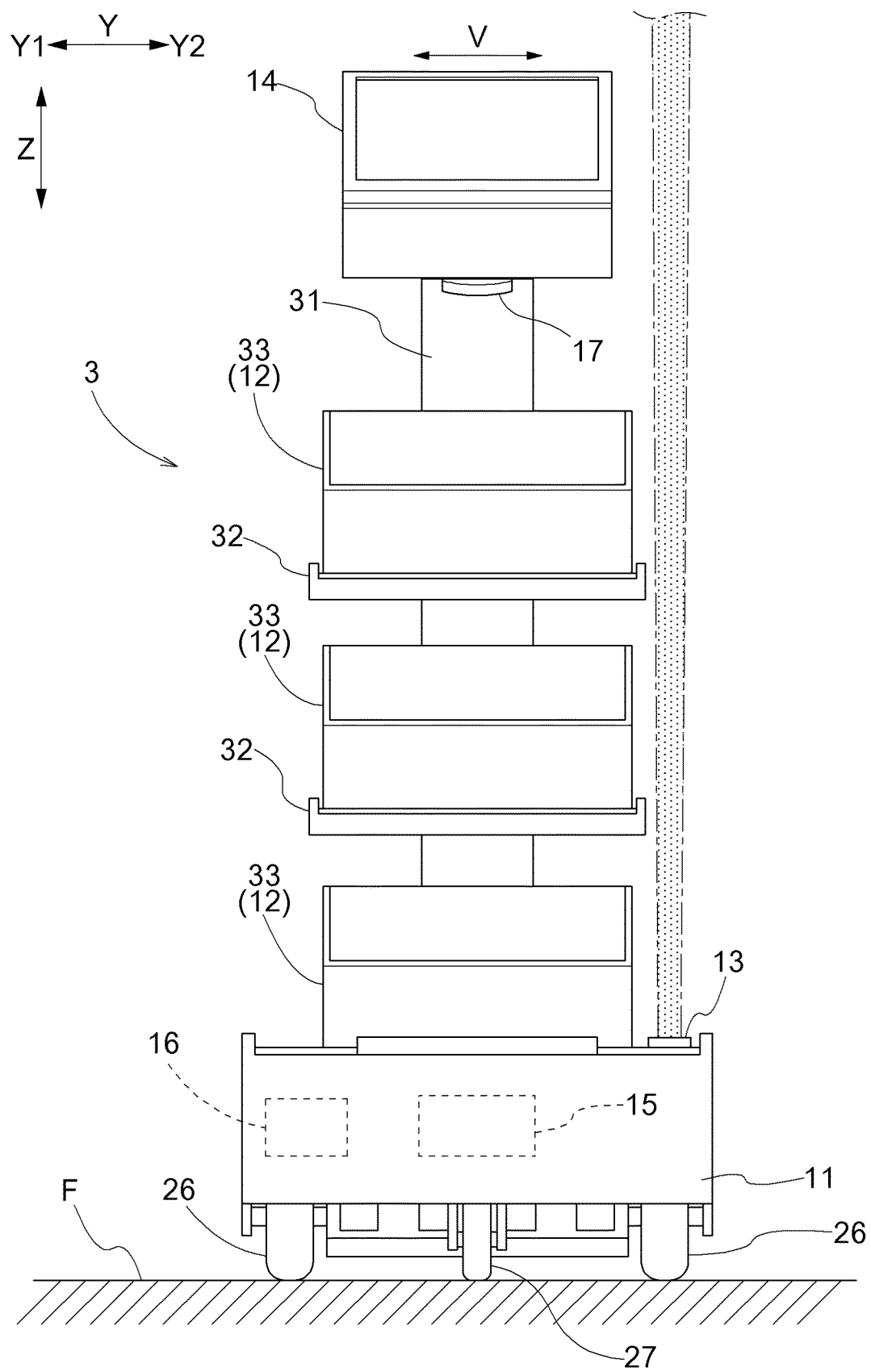
FIG. 3 is a rear view of an article transport vehicle.

As shown in FIG. 3, the article transport vehicle 3 includes a travel portion 11 that travels on the floor surface F, a supporting portion 12 that supports the article W, an illumination portion 13 that emits light, a display portion 14 that displays the picking information and the storage information, and a control portion 15 that controls the travel portion 11, the illumination portion 13, and the display portion 14. In addition, as shown in FIG. 6, the article transport vehicle 3 includes a battery 16 (see FIG. 3), a bar code reader 17 that reads the bar code displayed on each article W, a weighing portion 18 that measures the weight of the article W supported by the supporting portion 12, and an identification information reading portion 19 that reads the identification information of the operator M. The battery 16 supplies driving power to the travel portion 11, the illumination portion 13, the display portion 14, the bar code reader 17, the weighing portion 18, and the identification information reading portion 19.

The travel portion 11 includes a pair of travel wheels 26 arranged in the second direction Y, following wheels 27 installed on both sides in the first direction X with respect to the pair of travel wheels 26, and a travel motor 28 (see FIG. 6) that rotationally drives the travel wheels 26. The travel motor 28 is driven by the driving power supplied from the battery 16. The travel portion 11 travels forward by both of the pair of travel wheels 26 being rotated in the forward direction by the travel motor 28, and travels backward by both of the pair of travel wheels 26 being rotated in the reverse direction by the travel motor 28. In addition, the travel portion 11 travels so as to turn by the pair of travel wheels 26 being rotated at different rotation speeds by the travel motor 28. Note that the directions are defined here based on a state in which the article transport vehicle 3 is stopped in an orientation in which the front-rear direction U of the article transport vehicle 3 extends along the first direction X as shown in FIG. 4. In the state shown in FIG. 4, the forward side U1 of the article transport vehicle 3 faces the first direction-second side X2, the rearward side U2 of the article transport vehicle 3 faces the first direction-first side X1, the right side of the article transport vehicle 3 faces the storage section side Y2, and the left side of the article transport vehicle 3 faces the aisle side Y1.

A strut 31 is provided standing on the travel portion 11. In the illustrated example, two support platforms 32 are supported at intermediate positions of the strut 31 in the vertical direction Z so as to be arranged in the vertical direction Z. In addition, the display portion 14 is supported at an upper end of the strut 31. A transporting container 33 is supported on each of the travel portion 11 and the two support platforms 32, and each of the transporting containers 33 corresponds to the supporting portion 12 that supports the article W.

The display portion 14 is configured to be able to display the picking information and the storage information. The display portion 14 includes a touch panel, and is configured to be operable by the operator M. In a state in which the article transport vehicle 3 is stopped such that the forward side U1 of the article transport vehicle 3 faces the first direction-second side X2 as shown in FIG. 4, the display portion 14 is installed such that a display screen for displaying various types of information faces the first direction-first side X1 and the upper side.

Figure 5:
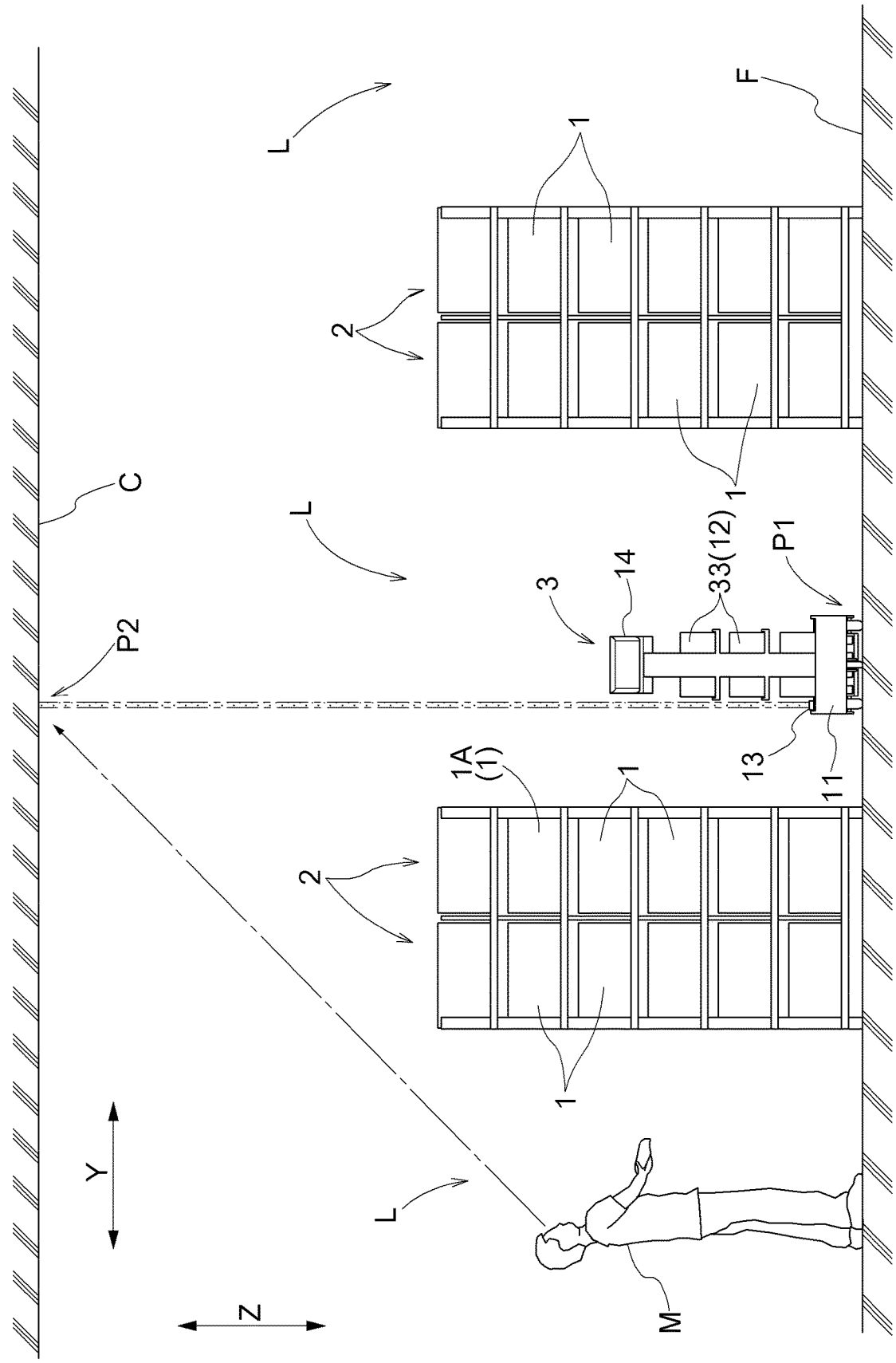
FIG. 5 is a front view showing a state in which the illumination portion is illuminating an illuminating position.

In a state in which the travel portion 11 is at a set position P1, the illumination portion 13 emits light to an illuminating position P2 that is located above the article storage rack 2 (plurality of storage sections 1) and that corresponds to the own vehicle (article transport vehicle in which the illumination portion 13 is provided). More specifically, as shown in FIG. 5, the set position P1 is set on an operation aisle L, and the ceiling of a plant in which the picking facility is installed is located above the operation aisle L. Accordingly, in a state in which the travel portion 11 is at the set position P1, light that has been emitted directly upward from the illumination portion 13 is emitted onto a downwardly facing ceiling surface C of the ceiling. Also, the position illuminated by the illumination portion 13 in a state in which the travel portion 11 is at the set position P1 in this manner corresponds to an illuminating position P2. That is, the illuminating position P2 is set on the ceiling surface C located directly above the own vehicle. In the present embodiment, the illumination portion 13 emits visible radiation that the operator M can perceive with the naked eye. In addition, in the present embodiment, the illuminating position P2 is visible from an operator M who is performing an operation on an operation aisle L different from the operation aisle L located directly below the illuminating position P2.

The illumination portion 13 is configured to be able to emit, to the illuminating position P2, operation information serving as information indicating whether or not the operator M is performing an operation on the own vehicle, priority information serving as information indicating the degree of priority of the own vehicle, storage classification information indicating whether the target storage section 1A is a storage section 1 at a retrieval location (a storage section 1 from which the article W is to be retrieved in the picking operation) or a storage section 1 at a storage location (a storage section 1 in which the article W is to be stored in the storage operation), and abnormality information indicating that an abnormality has occurred in the own vehicle. In the present embodiment, the illumination portion 13 displays the storage classification information using the color of light that is emitted. Specifically, the illumination portion 13 is configured to be able to emit a plurality of colors of light, and is configured to differentiate the color of light emitted to the illuminating position P2 between when the target storage section 1A is the storage section 1 at a retrieval location, and when the target storage section 1A is the storage section 1 at a storage location.

In addition, the illumination portion 13 displays the operation information, which indicates whether or not the operator M is performing an operation on the own vehicle, using the size of the range to which light is emitted. In the present example, the illumination portion 13 is configured to illuminate a larger range when the operator M is not performing an operation on the own vehicle, than when the operator M is performing an operation on the own vehicle. In the present embodiment, the illumination portion 13 illuminates a range formed by a circular shape having a radius of a first length (hereinafter referred to as a "large range") when the operator M is not performing an operation on the own vehicle, and illuminates a range formed by a circular shape having a radius of a second length which is shorter than the first length (hereinafter referred to as a "small range") when the operator M is performing an operation on the own vehicle.

In addition, the illumination portion 13 is configured to display the priority information, which indicates the degree of priority, using the flashing interval of light that is emitted. For example, the illumination portion 13 may be configured such that the shorter the flashing interval of the light, the higher the degree of priority that is indicated. Here, when the degree of priority is indicated in two levels, the illumination portion 13 may be configured indicate a low degree of priority by continuously emitting light, and indicates a high degree of priority by intermittently emitting (flashing) light. In the present embodiment, as an example, a configuration is described in which the degree of priority is determined in two levels.

In addition, the illumination portion 13 is configured to display the abnormality information, which indicates that an abnormality has occurred in the own vehicle, using the shape of light that is emitted. In the present example, light is emitted of a shape and a color that are different from those used for the operation information, the priority information, and the storage classification information described above. Specifically, the illumination portion 13 illuminates a range formed by a circular shape when indicating the operation information, the priority information, and the storage classification information described above, whereas the illumination portion 13 illuminates a range formed by a rectangular shape when indicating the abnormality information. Furthermore, in the present example, the illumination portion 13 indicates the abnormality information also by emitting light of a color (e.g., red) that is different from a color used when indicating the storage classification information.

The identification information reading portion 19 is configured to be able to read the identification information of each operator M that is held in the identification information holder 10 that the operator M has. In the present embodiment, the identification information reading portion 19 is configured to be able to exchange information with the identification information holder 10 via wireless communication. Specifically, the identification information reading portion 19 is formed by a reader that reads the identification information stored in the RFID tag. Also, the identification information reading portion 19 is set such that the communication range thereof is a range in which an operator M is assumed to be present when the operator M causes the bar code reader 17 to read the bar code of an article W before causing the supporting portion 12 to support the article W. That is, the communication range is set such that, when an operator M causes the bar code reader 17 to read the bar code of an article W, the identification information reading portion 19 reads the identification information of the identification information holder 10 that the operator M has, but does not read the identification information of the identification information holder 10 that an operator M located away from the own vehicle (article transport vehicle in which the identification information reading portion 19 is provided). A communication distance that is the radius of such a communication range is set to be 1 m, for example. Thus, the identification information reading portion 19 is configured to read the identification information of an identification information holder 10 that is present at a distance closer than a preset communication distance.

The control portion 15 executes, based on the picking information and the storage information transmitted from the control device H, a first travel control (corresponding to travel control) and a second travel control to control the travel portion 11, a display control to control the display portion 14, a first illumination control (corresponding to illumination control) to control the illumination portion 13 so as to emit light to the illuminating position P2 in a state in which the travel portion 11 is at the set position P1, a second illumination control to control the illumination portion 13 so as to display the abnormality information at the illuminating position P2 when the travel portion 11 has stopped at a position other than the set position P1 during the first travel control, a reading control to read the identification information of the operator M by the identification information reading portion 19, and a detection control to detect that an operation has been completed.

The first travel control controls the travel portion 11 so as to cause the travel portion 11 to travel to a set position P1 that is set in correspondence with the target storage section 1A. The set position P1 is set on the aisle side Y1 and the first direction-first side X1 or the first direction-second side X2 in the first direction X with respect to the target storage section 1A. In the example shown in FIG. 4, the article transport vehicle 3 is stopped at a set position P1 that is set on the aisle side Y1 and the first direction-second side X2 with respect to the target storage section 1A. The second travel control is a control to control the travel portion 11 so as to cause the travel portion 11 to travel to an operating position (not shown). The operating position is set in correspondence with a location where an operation for unloading an article W supported by the supporting portion 12 from the article transport vehicle 3 by the picking operation, or an operation for causing the supporting portion 12 to support an article W to be stored in a storage section 1 by the storage operation is performed. If the remaining capacity of the battery 16 has decreased to be less than or equal to a set value during execution of the first travel control, the control portion 15 interrupts the first travel control and stops the travel portion 11. Note that the control portion 15 may also interrupt the second travel control and stop the travel portion 11 when the remaining capacity of the battery 16 is less than or equal to the set value during execution of the second control. In addition, the control portion 15 also interrupts the first travel control or the second travel control and stops the travel portion 11 if an event has occurred that prevents the travel portion 11 from continuing normal traveling due to the presence of an obstacle, or a failure or the like of the travel portion 11.

The display control controls the display portion 14 so as to cause the display portion 14 to display number information indicating the number of articles W to be placed into, and taken out of, the target storage section 1A, type information indicating the type of articles W to be placed into, and taken out of, the target storage section 1A, position information indicating the position of the target storage section 1A, the storage classification information, and container information indicating the container into and out of which the articles W are to be placed and taken, from among the plurality of transporting containers 33. When the display control is executed based on the picking information, the control portion 15 displays, on the display portion 14, the position of the target storage section 1A, and the number information and the type information of the articles W to be retrieved from the target storage section 1A, and also displays, on the display portion 14, a character string or a mark indicating that the operation is the picking operation as the storage classification information. In addition, when the display control is executed based on the storage information, the control portion 15 displays, on the display portion 14, the position of the target storage section 1A, and the number information and the type information of the articles W to be stored in the target storage section 1A, and also displays, on the display portion 14, a character string or a mark indicating that the operation is the storage operation as the storage classification information.

The control portion 15 is configured to read the bar code of each article W by the bar code reader 17, thereby determining the type of the article W whose bar code has been read. The control portion 15 determines that an article W of the type determined by reading the bar code of the article W by the bar code reader 17 is the article W that is to be loaded or unloaded to or from the supporting portion 12, and if the determined type of the article W and the type of the article W that is indicated by the type information are different from each other, the control portion 15 causes the display portion 14 to display information indicating an error.

In addition, weight information indicating the weight of each article W is stored in the control portion 15, and the weighing portion 18 is configured to separately measure the weight of each of a plurality of supporting portions 12, or measure the overall weight of a plurality of supporting portions 12. The control portion 15 determines whether or not articles W of the type indicated by the type information are loaded or unloaded to or from the designated supporting portion 12 by the number indicated by the number information, based on the change of the weight measured by the weighing portion 18 and the weight information of the articles W to be supported by the supporting portion 12. If it is determined that articles W of a different type have been loaded or unloaded to or from the supporting portion 12, or that the number of articles W that is indicated by the number information have been loaded or unloaded to or from the supporting portion 12, or that articles W have been loaded or unloaded to or from a supporting portion 12 different from the designated supporting portion 12, the control portion 15 causes the display portion 14 to display information indicating an error.

Also, if it is determined that, in the detection control, the type of the articles W that has been determined based on the information read by the bar code reader 17 matches the type of the articles W that is indicated by the type information, and that the articles W of the type indicated by the type information have been loaded or unloaded to or from the designated supporting portion 12 by the number indicated by the number information, the control portion 15 determines that the articles W have been properly loaded or unloaded to or from the supporting portion 12. More specifically, the control portion 15 determines that the articles W have been properly supported by the supporting portion 12 in a detection control based on the picking information, and determines that the articles W have been properly unloaded from the supporting portion 12 in a detection control based on the storage information. As described above, the control portion 15, the bar code reader 17, and the weighing portion 18 constitute a detection unit 35 for detecting that the articles W retrieved from the target storage section 1A have been properly supported by the supporting portion 12.

Upon the bar code reader 17 reading the bar code, the control portion 15 reads, by the identification information reading portion 19, the identification information of the identification information holder 10 of an operator M present within the communication range. Also, the control portion 15 determines that the operator M is not performing an operation on (is not operating with) the own vehicle (article transport vehicle in which the control portion 15 is provided) during a period after the control portion 15 causes the travel portion 11 to travel to the set position P1 by the first travel control until the identification information reading portion 19 reads the identification information of the operator M by the reading control, and determines that the operator M is performing an operation (is operating) on the own vehicle during a period after the control portion 15 reads the identification information of the operator M of the identification information reading portion 19 by the reading control until the control portion 15 determines, by the detection control, that the articles W have been properly loaded or unloaded. Thus, the control portion 15 determines whether or not an operator M is operating with the own vehicle, based on the detection information of the identification information reading portion 19.

In the present embodiment, after causing the travel portion 11 to travel to the set position P1 by the first travel control, the control portion 15 measures an elapsed time since the completion of the first travel control, and determines that the degree of priority of the own vehicle is low if the elapsed time is less than or equal to a set value, and determines that the degree of priority of the own vehicle is high if the elapsed time exceeds the set value. That is, in the present embodiment, a priority-degree determining condition for determining the degree of priority is a condition that, based on a waiting time of the own vehicle at the current set position P1, the determined degree of priority increases with an increase in the waiting time, assuming that the necessity to expedite the operation of the operator M is high. In the present example, the degree of priority is determined in two levels, and therefore whether the degree of priority is "high" or "low" is determined based on whether or not the waiting time exceeds the set value.

The first illumination control controls the illumination portion 13 so as to emit light to the illuminating position P2. The control portion 15 controls the illumination portion 13 so as to display the operation information at the illuminating position P2 in the first illumination control, based on whether or not the operator M is operating with the own vehicle. In the present embodiment, based on the detection information of the identification information reading portion 19, the control portion 15 controls the illumination portion 13 such that light is emitted from the illumination portion 13 so as to illuminate the large range in a state in which it is determined that the operator M is not operating with the own vehicle, and such that light is emitted from the illumination portion 13 so as to illuminate the small range in a state in which it is determined that the operator M is operating with the own vehicle.

In addition, the control portion 15 controls the illumination portion 13 so as to display the priority information at the illuminating position P2 in the first illumination control, according to the degree of priority determined based on the above-described priority-degree determining condition. In the present embodiment, according to the waiting time of the own vehicle at the current set position P1, the control portion 15 controls the illumination portion 13 such that light is continuously emitted from the illumination portion 13 in a state in which it is determined that the degree of priority is low, assuming that the necessity to expedite the operation of the operator M at the current set position P1 is low, and such that light is intermittently emitted from the illumination portion 13 in a state in which it is determined that the degree of priority is high, assuming that the necessity to expedite the operation of the operator M at the current set position P1 is high.

In addition, in the first illumination control, the control portion 15 controls the illumination portion 13 so as to display, at the illuminating position P2, the storage classification information according to whether the target storage section 1A is a storage section 1 at a retrieval location or a storage section 1 at a storage location. In the present example, the control portion 15 controls the illumination portion 13 so as to display the storage classification information at the illuminating position P2 by differentiating the light of color emitted from the illumination portion 13 between when the first illumination control is executed based on the picking information, and when the first illumination control is executed based on the storage information.

The second illumination control controls the illumination portion 13 so as to emit light to the illuminating position P2, as in the case of the first illumination control. However, whereas the first illumination control is executed in a state in which the travel portion 11 is at the set position P1 set for the target storage section 1A, the second illumination control is executed in a state in which the travel portion 11 is at a position other than the set position P1 set for the target storage section 1A. That is, the second illumination control is executed when the travel portion 11 has stopped abnormally during execution of the first travel control, before reaching the set position P1 set for the target storage section 1A. In the present embodiment, the travel portion 11 stops abnormally when an event that prevents the travel portion 11 from continuing normal traveling has occurred during execution of the first travel control. Examples of such an event include a case where the first travel control by the travel portion 11 cannot be continued as a result of the traveling path being blocked by some obstacle, a case where a failure that makes it difficult for the travel portion 11 to continue traveling has occurred in the travel portion 11, and a case where the travel portion 11 has stopped as a result of the first travel control being interrupted because the remaining amount of charge in the battery 16 has decreased to be less than or equal to the set value. Also, if the control portion 15 determines that the travel portion 11 has stopped abnormally at a position other than the set position P1, the control portion 15 executes the second illumination control.

Figure 7:
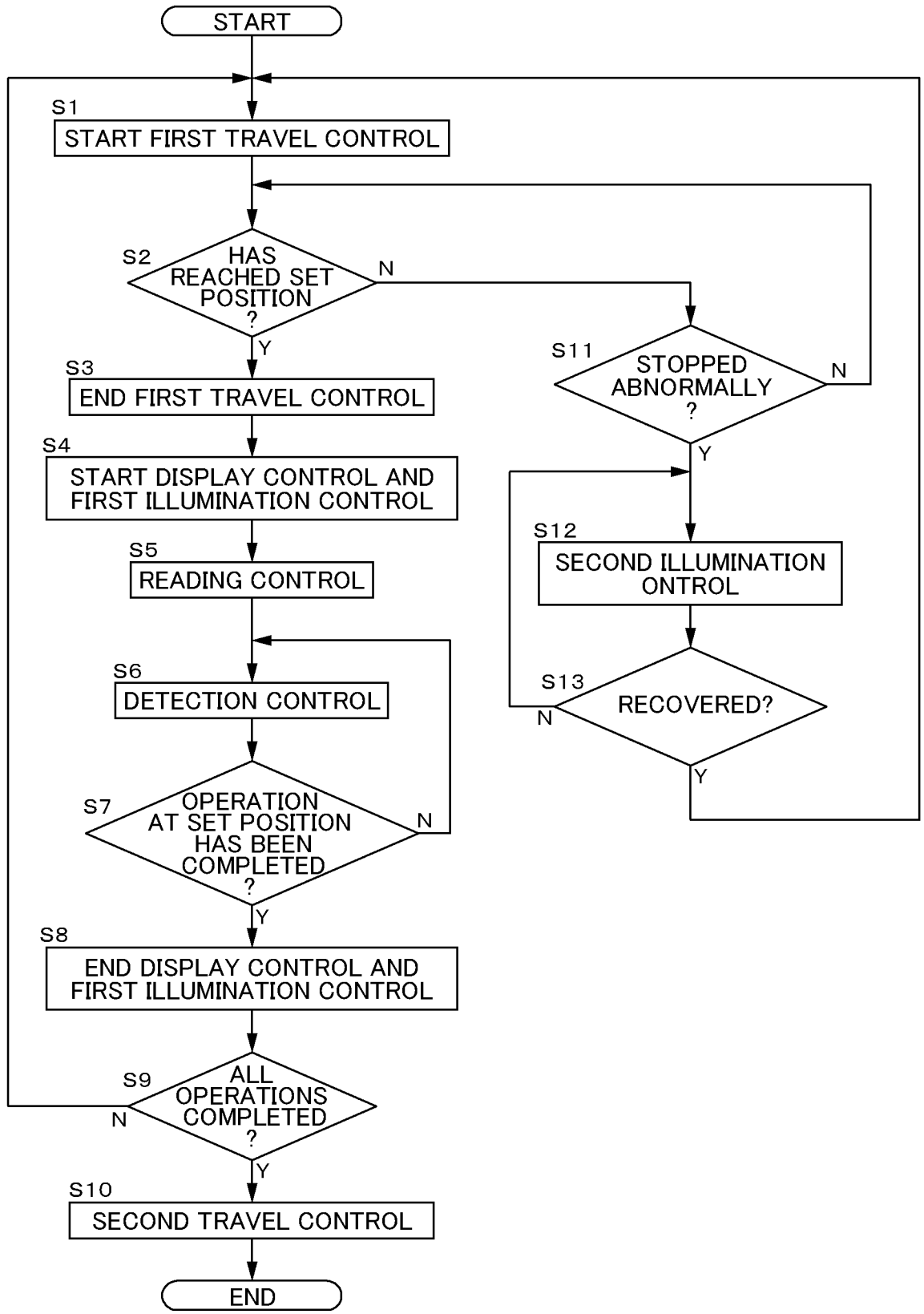
FIG. 7 is a control flowchart of a control portion.

Next, the control executed by the control portion 15 will be described with reference to the flowchart shown in FIG. 7. When picking information or storage information is received from the higher order control portion, the control portion 15 starts the first travel control (S1), and ends the first travel control upon the travel portion 11 reaching the set position P1 corresponding to the target storage section 1A of a plurality of target storage sections 1A are designated, one of the target storage sections 1A) designated by the picking information or the storage information (S2, S3). The control portion 15 starts the display control and the first illumination control (S4) in a state in which the travel portion 11 is located at the set position P1. Then, the control portion 15 executes the reading control (S5) upon the bar code of the article W being read by the bar code reader 17, and thereafter, determines, by the detection control, whether or not the operation at one set position P1 has been completed (whether the articles W have been properly loaded or unloaded to or from the supporting portion 12) (S6, S7). If the operation at one set position P1 have been completed (S7: Yes), the control portion 15 ends the display control and the first illumination control (S8). Then, if the operations on all of a plurality of target storage sections 1A designated by the picking information and the storage information has been completed (S9: Yes), the control portion 15 executes the second travel control (S10). On the other hand, when the operation at one set position P1 has been completed, if the plurality of target storage sections 1A designated by the picking information and the storage information include any target storage section 1A on which the operation has not been completed (S9: No), the control portion 15 starts the next first travel control so as to cause the travel portion 11 to travel to the set position P1 corresponding to the target storage section 1A on which the operation has not been completed (S1).

In addition, the control portion 15 continues the first travel control if the travel portion 11 continues normal traveling (S11: No) during execution of the first travel control; however, if the travel portion 11 has stopped abnormally (S11: Yes) owing to the occurrence of the above-described event during execution of the first travel control, the control portion 15 executes the second illumination control (S12). Thereafter, the control portion 15 continues the second illumination control (S12) until the travel portion 11 recovers from the abnormally stopped state (S13: No). If the travel portion 11 has recovered from the abnormally stopped state (S13: Yes), the control portion 15 restarts the first travel control (S1).

The control portion 15 starts the first illumination control upon completion of execution of the first travel control in the manner described above, and ends the first illumination control after determining, by the detection control, that the operation at one set position P1 has been completed and before executing the second travel control. In the first illumination control, as shown in the flowchart in FIG. 8, first, light of the color corresponding to the storage classification is continuously emitted to the large range (S21). Then, if the identification information reading portion 19 reads the identification information by execution of the reading control in a state in which the light illumination range is the large range (S22: No, S24: Yes), the control portion 15 determines that an operator M is operating with the own vehicle, and changes the light illumination range from the large range to the small range (S25). In addition, if the set time period has elapsed since the completion of execution of the first travel control in a state in which light is continuously emitted (S23: No, S26: Yes), the control portion 15 determines that the degree of priority of the own vehicle is high, and changes the light emission interval from the continuously emitting state to the intermittently emitting state (S27).

2. Other Embodiments

Next, other embodiments of the article transport vehicle will be described.

(1) Although the illuminating position P2 is set on the ceiling surface C in the above embodiment, the illuminating position P2 may be changed as appropriate. For example, an object to be illuminated may be set above a plurality of storage sections 1 (article storage rack 2), and the illuminating position P2 may be set on the object to be illuminated. The illuminating position P2 may also be set on an installation, such as a beam, provided in the picking facility.

(2) Although the operation information, the priority information, the storage classification information, and the abnormality information are displayed at the illuminating position P2 in the above embodiment, it is possible to adopt a configuration in which only some of the operation information, the priority information, the storage classification information, and the abnormality information may be displayed at the illuminating position P2. It is also possible to adopt a configuration in which information other than the operation information, the priority information, the storage classification information, and the abnormality information may be displayed at the illuminating position P2.

(3) The above embodiment is described, taking, as an example, a configuration in which the operation information is displayed using the size of the light illumination range at the illuminating position P2, the priority information is displayed using the flashing interval of light, the storage classification information is displayed using the color of light, and the abnormality information is displayed using the shape and the color of light at the illuminating position P2. However, the display methods of the pieces of information are not limited thereto. That is, it is possible to adopt a configuration in which the operation information is displayed using the flashing interval of light, or the shape or color of light, a configuration in which the priority information is displayed using the size of the light illumination range, or the color or shape of light, a configuration in which the storage classification information is displayed using the size of the light illumination range, the flashing interval of light, or the shape of light, or a configuration in which the abnormality information is displayed using the flashing interval of light, the size of the light illumination range, or one of the shape and the color of light. Alternatively, it is possible to adopt a configuration in which these pieces of information are displayed using a character string, a mark, or the like, or a configuration in which these pieces of information are displayed using the intensity (lightness) of light, or a configuration in which these pieces of information are displayed using the presence or absence of light emission. A plurality of the various display methods described above may also be combined to display each of the pieces of information.

(4) Although the degree of priority is determined based on the waiting time of the own vehicle at the current set position P1 in the above embodiment, the priority-degree determining condition may be changed as appropriate. Specifically, the degree of priority may be determined such that the degree of priority increases with a decrease in the time until the shipping deadline of the article W to be supported by the supporting portion 12. The degree of priority may also be determined such that the degree of priority increases with an increase in the number of set positions P1 toward which the own vehicle is determined to move subsequently (the number of target storage sections 1A on which the operation has not been completed, from among a plurality of target storage sections 1A designated by the picking information and the storage information). The degree of priority may also be determined such that the degree of priority increases with a decrease in the remaining amount of charge in the battery 16. The degree of priority may also be determined based on two or more of the waiting time of the own vehicle, the shipping deadline of the article W, the number of set positions P1 toward which the own vehicle moves subsequently, and the remaining amount of charge in the battery 16. Alternatively, the degree of priority may be determined using a condition other than the above-described conditions.

(5) Although whether or not the operator M is operating with the own vehicle is determined based on the identification information of the identification information reading portion 19 in the above embodiment, the information based on which whether or not the operator M is operating with the own vehicle is determined may be changed as appropriate. Specifically, whether or not the operator M is operating with the own vehicle may be determined based on reading information of the bar code reader 17 or weighing information of the weighing portion 18. In this case, whether or not the operator M is operating with the own vehicle may be determined based on whether or not the bar code reader 17 reads the bar code of the article W or whether or not there is any change in the weight measured by the weighing portion 18, in a state in which the article transport vehicle 3 is at the set position P1.

(6) Although the illumination portion 13 emits light directly upward in the above embodiment, the illumination portion 13 may emit light obliquely upward.

(7) Although the storage section 1 at a storage location is also used as the target storage section 1A, as well as the storage section 1 at a retrieval location in the above embodiment, only the storage section 1 at a retrieval location may be used as the target storage section 1A.

(8) Although the illumination control and the display control are started upon completion of the travel control in the above embodiment, one or both of the illumination control and the display control may be started before completion of the travel control. That is, for example, the display control may be started simultaneously with the start of the travel control, or started during execution of the travel control, and the illumination control may be started during execution of the travel control. Note that in the case of starting the illumination control during execution of the travel control, the illumination portion 13 may be configured to emit light that includes information indicating that the travel control is being executed (the travel portion 11 is traveling) or that the travel control has been completed (the travel portion 11 has stopped at the set position P1). In displaying this information as well, various display methods may be used as described in (3) above.

(9) Although the illumination portion 13 emits visible radiation in the above embodiment, the illumination portion 13 may emit invisible radiation (ultraviolet radiation, infrared radiation, etc.). Note that in this case, a member containing a fluorescent substance that emits light under invisible radiation may be provided at the illuminating position P2, or a coating containing the fluorescent substance may be applied thereto.

(10) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

3. Outline of the Embodiment

An outline of the article transport vehicle described above will be described below.

An article transport vehicle includes: a travel portion that travels to set positions that are set in one-to-one correspondence with a plurality of storage sections that store articles; a supporting portion that supports an article; an illumination portion that emits light; and a control portion that controls the travel portion and the illumination portion, wherein, using, as a target storage section, the storage section in which an article to be supported by the supporting portion is stored, the control portion executes travel control to control the travel portion so as to cause the travel portion to travel to the set position that is set in correspondence with the target storage section; and illumination control to control the illumination portion so as to emit light to an illuminating position that is located above the plurality of storage sections and that corresponds to the article transport vehicle in a state in which the travel portion is at the set position.

With this configuration, the travel portion travels to the set position by the control portion executing the travel control, and the illumination portion emits light to the illuminating position by the control portion executing the illumination control. The illuminating position is a position that is located above the plurality of storage sections and that corresponds to the article transport vehicle, and therefore, for example, an operator who is away from the article transport vehicle or an operator who is at a location separated by the storage sections can recognize that the article transport vehicle on which the picking operation needs to be performed is at the set position. This allows the operator to more easily notice that the picking operation needs to be performed on the article transport vehicle, thus making it possible to more easily perform the picking operation smoothly.

Here, it is preferable that the illumination portion is configured to be able to emit, to the illuminating position, operation information serving as information indicating whether or not an operator is operating with the article transport vehicle, and the control portion controls the illumination portion so as to display the operation information at the illuminating position in the illumination control, according to whether or not the operator is operating with the article transport vehicle.

With this configuration, the operation information is displayed at the illuminating position by the control portion executing the illumination control. Accordingly, by confirming the light emitted to the illuminating position, an operator who is not performing an operation on the article transport vehicle that is emitting light to the illuminating position can determine whether or not another operator is operating with the article transport vehicle that is emitting light. Thus, the operator can determine whether or not he or she needs to perform an operation on the article transport vehicle even when he or she is away from the article transport vehicle, it is therefore possible to more easily perform the picking operation smoothly.

In a configuration in which the operation information is displayed at the illuminating position as described above, it is preferable that the article transport vehicle includes an identification information reading portion that reads identification information of the operator that is held by an identification information holder that the operator has, wherein the control portion determines whether or not the operator is operating with the article transport vehicle, based on detection information of the identification information reading portion.

With this configuration, based on whether or not the identification information of an operator can be read by the identification information reading portion, it is possible to appropriately determine whether or not the operator is located in the vicinity of the article transport vehicle.

It is preferable that the illumination portion is configured to be able to emit, to the illuminating position, priority information serving as information indicating a degree of priority of the article transport vehicle, and the control portion controls the illumination portion so as to display the priority information at the illuminating position in the illumination control, according to a degree of priority that has been determined based on a predetermined priority-degree determining condition.

With this configuration, by confirming the light emitted to the illuminating position, the operator can recognize the degree of priority of the operation on the article transport vehicle corresponding to the illuminating position. Accordingly, it is possible allow the operator to preferentially perform the operation on the article transport vehicle having a high degree of priority. This prevents the delay of an operation on the article transport vehicle having a high degree of priority, thus making it possible to facilitate the picking operation.

It is preferable that wherein the priority-degree determining condition is a condition that the degree of priority is determined to be higher for a higher degree of necessity to expedite an operation by the operator at the current set position, based on at least one of a shipping deadline of the article to be supported by the supporting portion; a waiting time of the article transport vehicle at the current set position; the number of the set positions toward which the article transport vehicle has been determined to move subsequently; and, if the article transport vehicle is provided with a battery that supplies driving power to at least one of the travel portion, the illumination portion, and the control portion, the remaining amount of charge in the battery.

With this configuration, an article transport vehicle that transports an article whose shipping deadline is drawing near, an article transport vehicle having a longer waiting time at the current set position, an article transport vehicle having a larger number of set positions toward which the article transport vehicle moves subsequently, and an article transport vehicle having a smaller remaining amount of charge in the battery can be determined to be an article transport vehicle having a high degree of priority. Therefore, it is possible to allow the operator to preferentially perform an operation on these article transport vehicles.

It is preferable that, in addition to the storage section at a retrieval location in which the article to be supported by the supporting portion is stored, the storage section at a storage location in which the article supported by the supporting portion is to be stored is used as the target storage section.

With this configuration, it is possible to emit light to the illuminating position also when an article is stored in the storage section at the storage location, in addition to when an article is retrieved from the storage section at the retrieval location. Accordingly, it is possible to more easily perform the storage operation smoothly also when the operator performs a storage operation for storing an article in the target storage section, for example, in order to replenish articles.

In a configuration in which the storage section at the storage location in which an article is to be stored is also used as the target storage section as described above, it is preferable that the illumination portion is configured to be able to emit light so as to display, at the illuminating position, storage classification information indicating whether the target storage section is the storage section at the retrieval location or the storage section at the storage location, and the control portion controls the illumination portion so as to display, at the illuminating position, the storage classification information according to whether the target storage section is the storage section at the retrieval location or the storage section at the storage location in the illumination control.

With this configuration, light for displaying the storage classification information is emitted to the illuminating position, and it is therefore possible to allow the operator to recognize in advance whether the operation to be performed on the target storage section is an operation for retrieving an article from the target storage section or an operation for storing an article in the target storage section. Accordingly, even when both of the operation for retrieving an article from the target storage section and the operation for storing an article in the target storage section are possible, it is possible to facilitate these operations.

It is preferable that the illuminating position is set on a ceiling surface located directly above the article transport vehicle.

With this configuration, the illumination portion may simply project light directly upward, and therefore it is possible to simplify the configuration of the illumination portion, and also simplify the control of the illumination portion in the illumination control. In addition, the light from the illumination portion is emitted to the ceiling surface, and therefore the light can be easily viewed by the operator.

It is preferable that the illumination portion is configured to be able to emit, to the illuminating position, abnormality information indicating that an abnormality has occurred in the article transport vehicle, and the control portion executes, if the travel portion has stopped at a position other than the set position during execution of the travel control, a second illumination control to control the illumination portion so as to display the abnormality information at the illuminating position.

With this configuration, by confirming the light emitted to the illuminating position, the operator can recognize that the article transport vehicle has stopped abnormally at a position other than the set position. Accordingly, the operator can promptly find the article transport vehicle in which an abnormality has occurred. This makes it possible to quickly recover the article transport vehicle in which an abnormality has occurred.

INDUSTRIAL APPLICABILITY

The technique according to the present disclosure is applicable to an article transport vehicle including a supporting portion that supports an article.

DESCRIPTION OF REFERENCE SIGNS

1: Storage section
1A: Target storage section
10: Identification information holder
11: Travel portion
12: Supporting portion
13: Illumination portion
15: Control portion
16: Battery
19: Identification information reading portion
C: Ceiling surface
M: Operator
P1: Set position
P2: Illuminating position
W: Article

The invention claimed is:

1. An article transport vehicle comprising:
a travel portion that travels to set positions that are set in one-to-one correspondence with a plurality of storage sections that store articles;
a supporting portion that supports an article;
an illumination portion that emits light; and
a control portion that controls the travel portion and the illumination portion,
wherein, using, as a target storage section, the storage section in which an article to be supported by the supporting portion is stored, and wherein the control portion executes travel control to control the travel portion so as to cause the travel portion to travel to the set position that is set in correspondence with the target storage section, and the control portion executes illumination control to control the illumination portion so as to emit light to an illuminating position that is located above the plurality of storage sections and that corresponds to the article transport vehicle in a state in which the travel portion is at the set position, wherein the illumination portion is configured to be able to emit, to the illuminating position, operation information serving as information indicating whether or not an operator is operating with the article transport vehicle, and wherein the control portion controls the illumination portion so as to display the operation information at the illuminating position in the illumination control, according to whether or not the operator is operating with the article transport vehicle.

2. The article transport vehicle according to claim 1, further comprising an identification information reading portion that reads identification information of the operator that is held by an identification information holder that the operator has, and wherein the control portion determines whether or not the operator is operating with the article transport vehicle, based on detection information of the identification information reading portion.

3. The article transport vehicle according to claim 2, wherein the illumination portion is configured to be able to emit, to the illuminating position, priority information serving as information indicating a degree of priority of the article transport vehicle, and wherein the control portion controls the illumination portion so as to display the priority information at the illuminating position in the illumination control, according to a degree of priority that has been determined based on a predetermined priority-degree determining condition.

4. The article transport vehicle according to claim 2, wherein, in addition to the storage section at a retrieval location in which the article to be supported by the supporting portion is stored, the storage section at a storage location in which the article supported by the supporting portion is to be stored is used as the target storage section.

5. The article transport vehicle according to claim 2, wherein the illuminating position is set on a ceiling surface located directly above the article transport vehicle.

6. The article transport vehicle according to claim 2,
wherein the illumination portion is configured to be able to emit, to the illuminating position, abnormality information indicating that an abnormality has occurred in the article transport vehicle, and wherein the control portion executes, if the travel portion has stopped at a position other than the set position during execution of the travel control, a second illumination control to control the illumination portion so as to display the abnormality information at the illuminating position.

7. The article transport vehicle according to claim 1, wherein, in addition to the storage section at a retrieval location in which the article to be supported by the supporting portion is stored, the storage section at a storage location in which the article supported by the supporting portion is to be stored is used as the target storage section.

8. The article transport vehicle according to claim 7, wherein the illumination portion is configured to be able to emit light so as to display, at the illuminating position, storage classification information indicating whether the target storage section is the storage section at the retrieval location or the storage section at the storage location, and wherein the control portion controls the illumination portion so as to display, at the illuminating position, the storage classification information according to whether the target storage section is the storage section at the retrieval location or the storage section at the storage location in the illumination control.

9. The article transport vehicle according to claim 1, wherein the illuminating position is set on a ceiling surface located directly above the article transport vehicle.

10. The article transport vehicle according to claim 1, wherein the illumination portion is configured to be able to emit, to the illuminating position, abnormality information indicating that an abnormality has occurred in the article transport vehicle, and wherein the control portion executes, if the travel portion has stopped at a position other than the set position during execution of the travel control, a second illumination control to control the illumination portion so as to display the abnormality information at the illuminating position.

11. The article transport vehicle according to claim 1, wherein the control portion determines that the operator is operating with the article transport vehicle, in response to the operator's performing an operation of transferring an article between the article transport vehicle stopped at the set position and the target storage section.

12. The article transport vehicle according to claim 1, further comprising a weighing portion that measures a weight of the article supported by the supporting portion, wherein the control portion determines whether the operator is operating with the article transport vehicle based on whether there is a change in the weight measured by the weighing portion.

13. The article transport vehicle according to claim 1, wherein the illumination portion illuminates a larger range when the operator is not performing an operation on the article transport vehicle, than when the operator is performing an operation on the article transport vehicle.

14. An article transport vehicle comprising:
a travel portion that travels to set positions that are set in one-to-one correspondence with a plurality of storage sections that store articles;
a supporting portion that supports an article;
an illumination portion that emits light; and
a control portion that controls the travel portion and the illumination portion, wherein, using, as a target storage section, the storage section in which an article to be supported by the supporting portion is stored, and wherein the control portion executes travel control to control the travel portion so as to cause the travel portion to travel to a set position that is set in correspondence with the target storage section, and the control portion executes illumination control to control the illumination portion so as to emit light to an illuminating position that is located above the plurality of storage sections and that corresponds to the article transport vehicle in a state in which the travel portion is at the set position, wherein the illumination portion is configured to be able to emit, to the illuminating position, priority information serving as information indicating a degree of priority of the article transport vehicle, and wherein the control portion controls the illumination portion so as to display the priority information at the illuminating position in the illumination control, according to a degree of priority that has been determined based on a predetermined priority-degree determining condition.

15. The article transport vehicle according to claim 14, wherein the priority-degree determining condition is a condition that the degree of priority is determined to be higher for a higher degree of necessity to expedite an operation by an operator at a current set position, based on at least one of:
- a shipping deadline of the article to be supported by the supporting portion;
- a waiting time of the article transport vehicle at the current set position;
- a number of the set positions toward which the article transport vehicle has been determined to move subsequently; and
- if the article transport vehicle is provided with a battery that supplies driving power to at least one of the travel portion, the illumination portion, and the control portion, the remaining amount of charge in the battery.

16. The article transport vehicle according to claim 14, wherein, in addition to the storage section at a retrieval location in which the article to be supported by the supporting portion is stored, the storage section at a storage location in which the article supported by the supporting portion is to be stored is used as the target storage section.

17. The article transport vehicle according to claim 16, wherein the illumination portion is configured to be able to emit light so as to display, at the illuminating position, storage classification information indicating whether the target storage section is the storage section at the retrieval location or the storage section at the storage location, and wherein the control portion controls the illumination portion so as to display, at the illuminating position, the storage classification information according to whether the target storage section is the storage section at the retrieval location or the storage section at the storage location in the illumination control.

18. The article transport vehicle according to claim 14, wherein the illuminating position is set on a ceiling surface located directly above the article transport vehicle.

19. The article transport vehicle according to claim 14, wherein the illumination portion is configured to be able to emit, to the illuminating position, abnormality information indicating that an abnormality has occurred in the article transport vehicle, and
wherein the control portion executes, if the travel portion has stopped at a position other than the set position during execution of the travel control, a second illumination control to control the illumination portion so as to display the abnormality information at the illuminating position.

20. The article transport vehicle according to claim 14, wherein the illumination portion illuminates a larger range when the operator is not performing an operation on the article transport vehicle, than when the operator is performing an operation on the article transport vehicle.

* * * * *